No. 897,204. PATENTED AUG. 25, 1908.
E. H. HATHAWAY.
LEATHER BELT SCARFING MACHINE.
APPLICATION FILED MAR. 24, 1905.

9 SHEETS—SHEET 1.

WITNESSES:

INVENTOR:
Edward H. Hathaway
BY S. Scholfield
ATTY.

No. 897,204. PATENTED AUG. 25, 1908.
E. H. HATHAWAY.
LEATHER BELT SCARFING MACHINE.
APPLICATION FILED MAR. 24, 1905.

9 SHEETS—SHEET 4.

WITNESSES: INVENTOR:
Edward H. Hathaway
BY
ATTY.

No. 897,204.

E. H. HATHAWAY.
LEATHER BELT SCARFING MACHINE.
APPLICATION FILED MAR. 24, 1905.

PATENTED AUG. 25, 1908.

9 SHEETS—SHEET 5.

WITNESSES:

INVENTOR:
Edward H. Hathaway
J. Scholfield
BY
ATTY.

No. 897,204. PATENTED AUG. 25, 1908.
E. H. HATHAWAY.
LEATHER BELT SCARFING MACHINE.
APPLICATION FILED MAR. 24, 1905.

9 SHEETS—SHEET 6.

WITNESSES:

INVENTOR:
Edward H. Hathaway
J. Scholfield
BY
ATTY.

No. 897,204. PATENTED AUG. 25, 1908.
E. H. HATHAWAY.
LEATHER BELT SCARFING MACHINE.
APPLICATION FILED MAR. 24, 1905.

9 SHEETS—SHEET 7.

WITNESSES:

INVENTOR:
Edward H. Hathaway
BY S. Scholfield
ATTY.

No. 897,204.  
PATENTED AUG. 25, 1908.  
E. H. HATHAWAY.  
LEATHER BELT SCARFING MACHINE.  
APPLICATION FILED MAR. 24, 1905.  
9 SHEETS—SHEET 8.

WITNESSES:  
INVENTOR:  
Edward H. Hathaway  
BY S. Scholfield  
ATTY

No. 897,204. PATENTED AUG. 25, 1908.
E. H. HATHAWAY.
LEATHER BELT SCARFING MACHINE.
APPLICATION FILED MAR. 24, 1905.
9 SHEETS—SHEET 9.
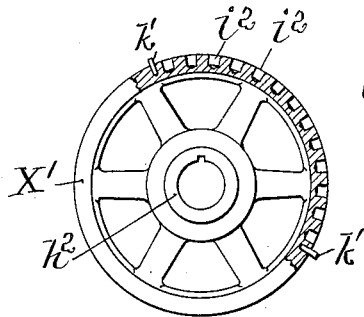
Fig. 9.
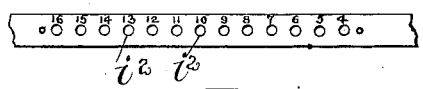
Fig. 10.
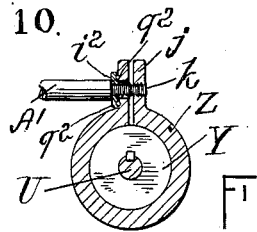
Fig. 11.
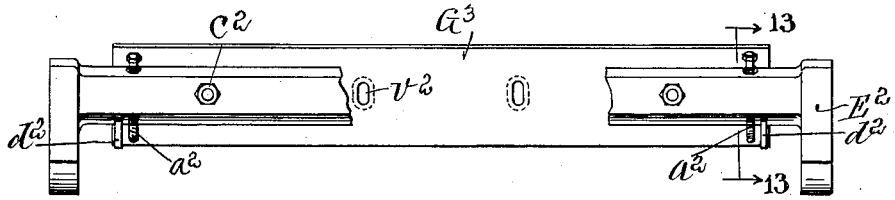
Fig. 12.
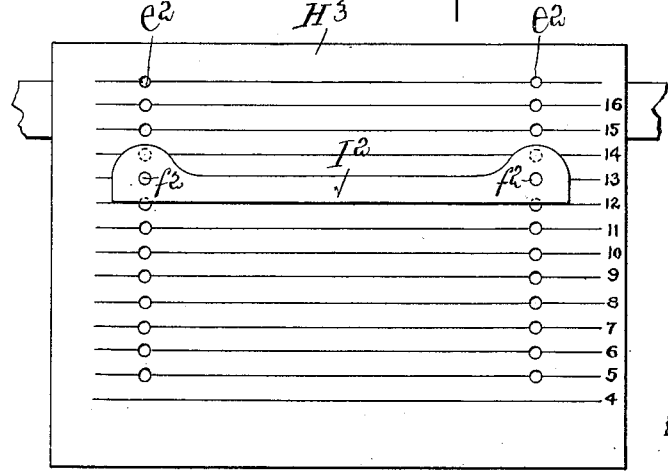
Fig. 15
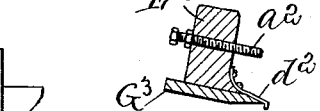
Fig. 13.
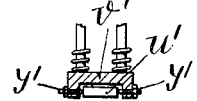
Fig. 14.
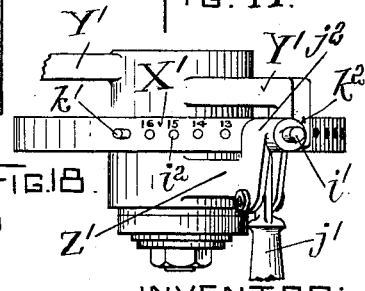
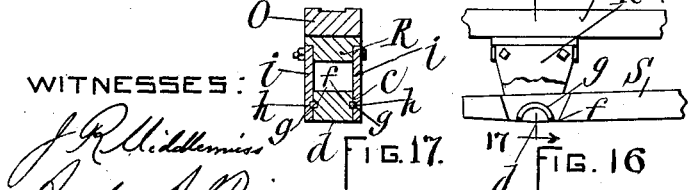
Fig. 16. Fig. 17.
WITNESSES:
J. R. Middlemiss
Andrew J. Peterson
INVENTOR:
Edward H. Hathaway
BY S. Scholfield
ATTY.

UNITED STATES PATENT OFFICE.

EDWARD H. HATHAWAY, OF PROVIDENCE, RHODE ISLAND.

LEATHER-BELT-SCARFING MACHINE.

No. 897,204.  Specification of Letters Patent.  Patented Aug. 25, 1908.

Application filed March 24, 1905. Serial No. 251,906.

*To all whom it may concern:*

Be it known that I, EDWARD H. HATHAWAY, a citizen of the United States, residing at Providence, in the State of Rhode Island, have invented a new and useful Improvement in Leather-Belt-Scarfing Machines, of which the following is a specification.

It is the object of my invention to provide a machine, in which the strip of belting will be automatically tapered ready for the operation of lapping the strips to form therefrom a driving belt. And my invention consists in the improved construction and arrangement of the several parts of the machine, whereby the relative position of the knife and the feeding bed may be readily adjusted to the thickness of the leather strip which is to be operated upon, and the space between the knife and the feeding bed be automatically and uniformly diminished, as the leather strip is being withdrawn from between the knife and the feeding bed; and it also consists in the improved construction and arrangement of the several parts of the machine, as hereinafter set forth.

Figure 1:
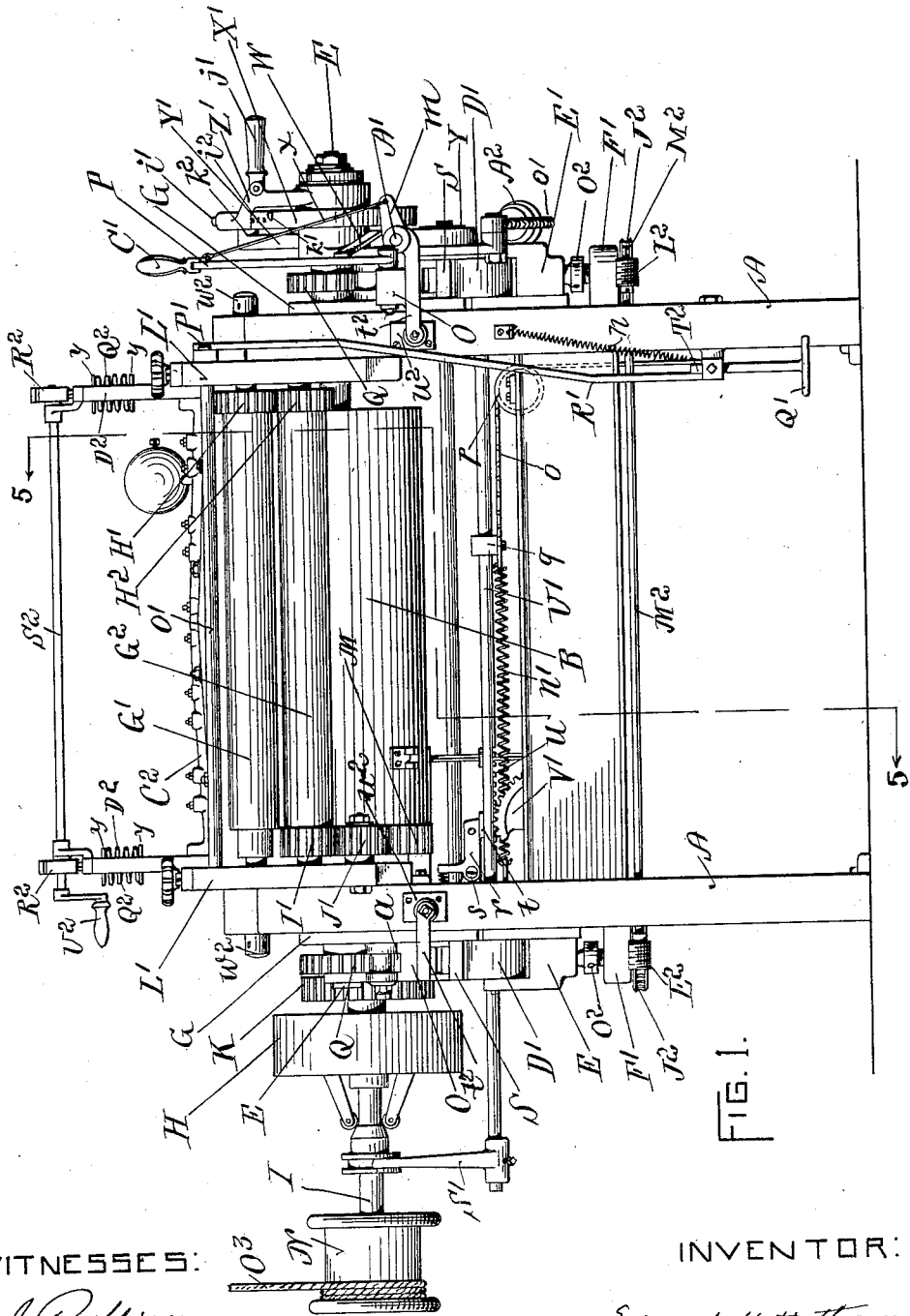
Figure 2:
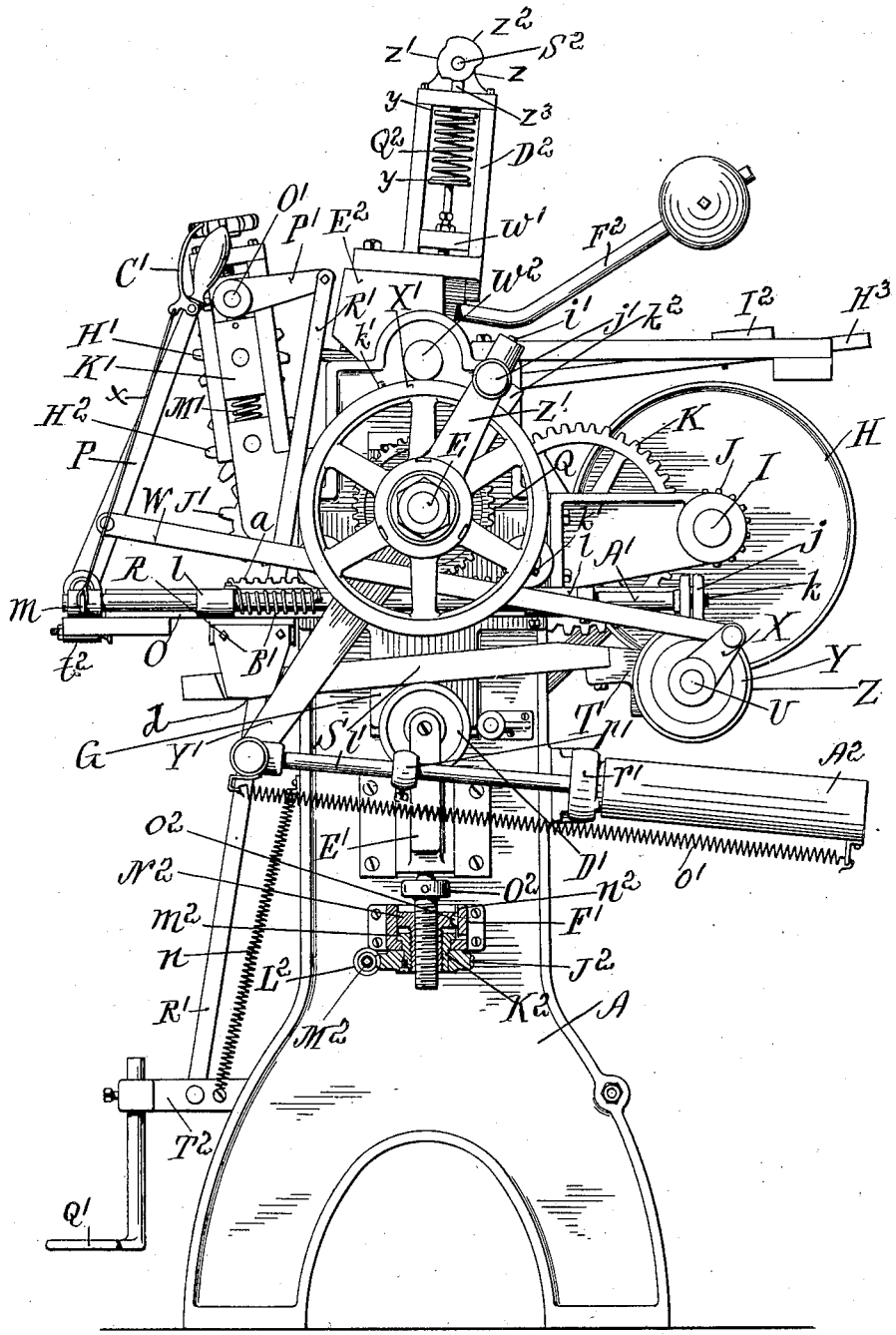
Figure 3:
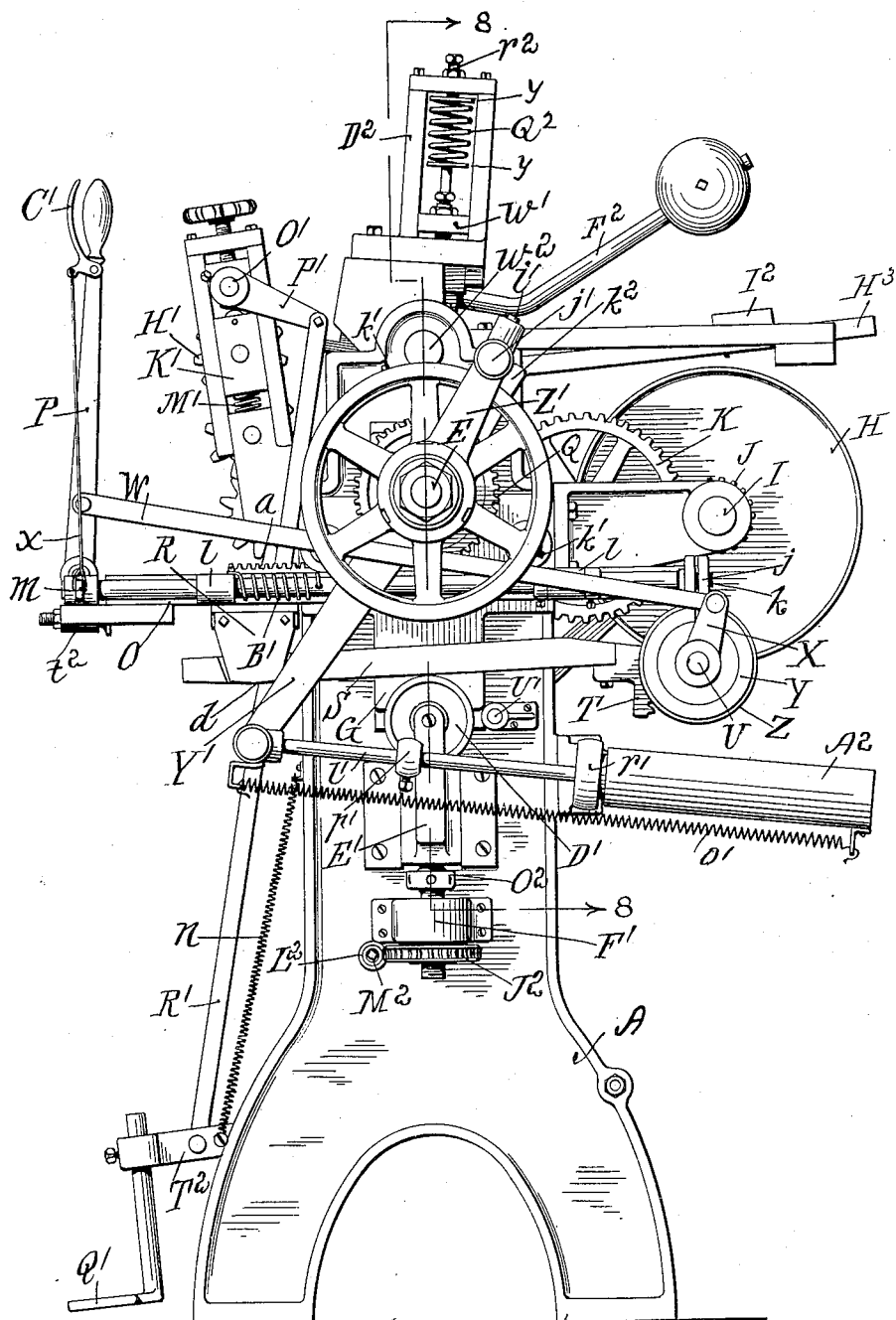
Figure 4:
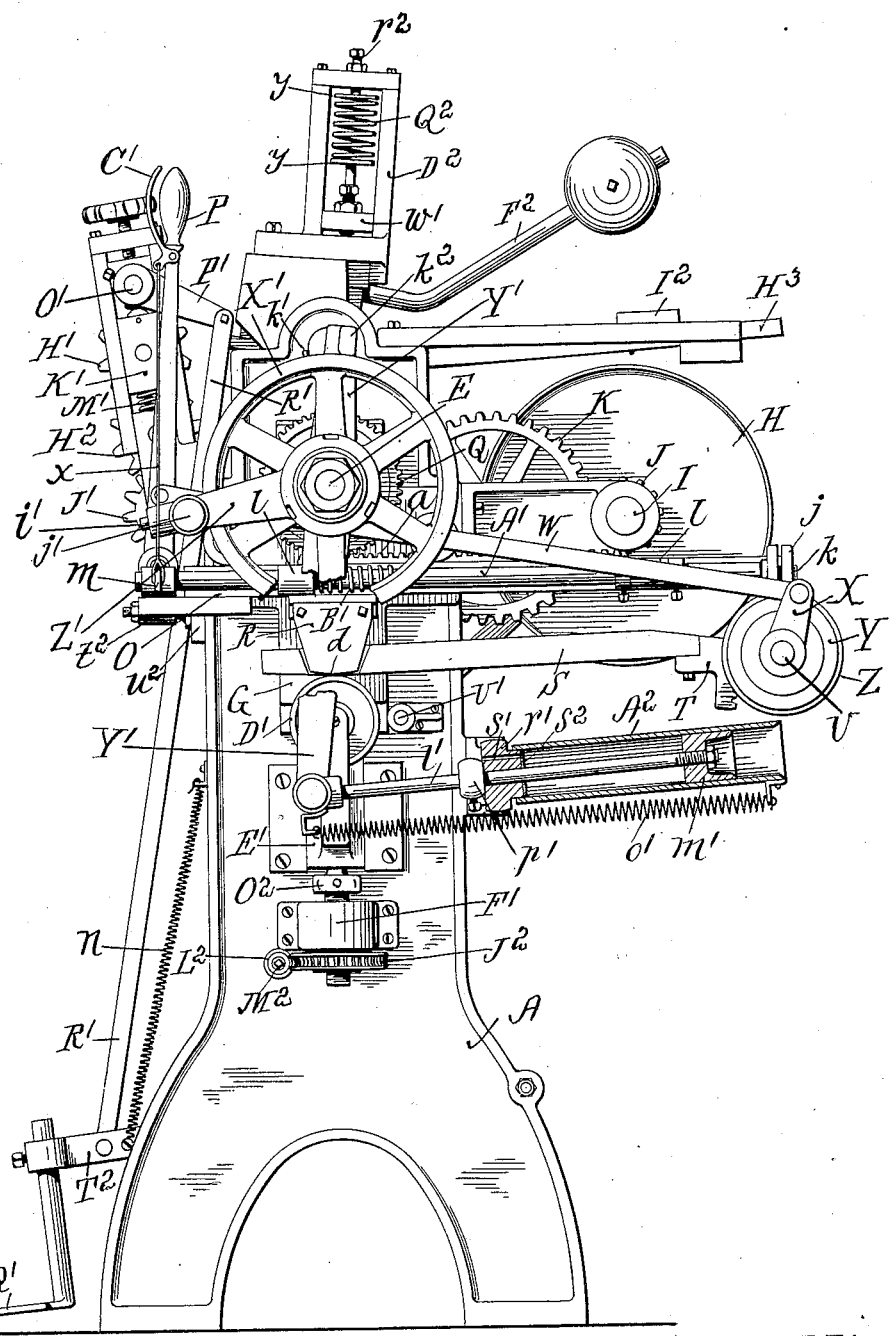
Figure 5:
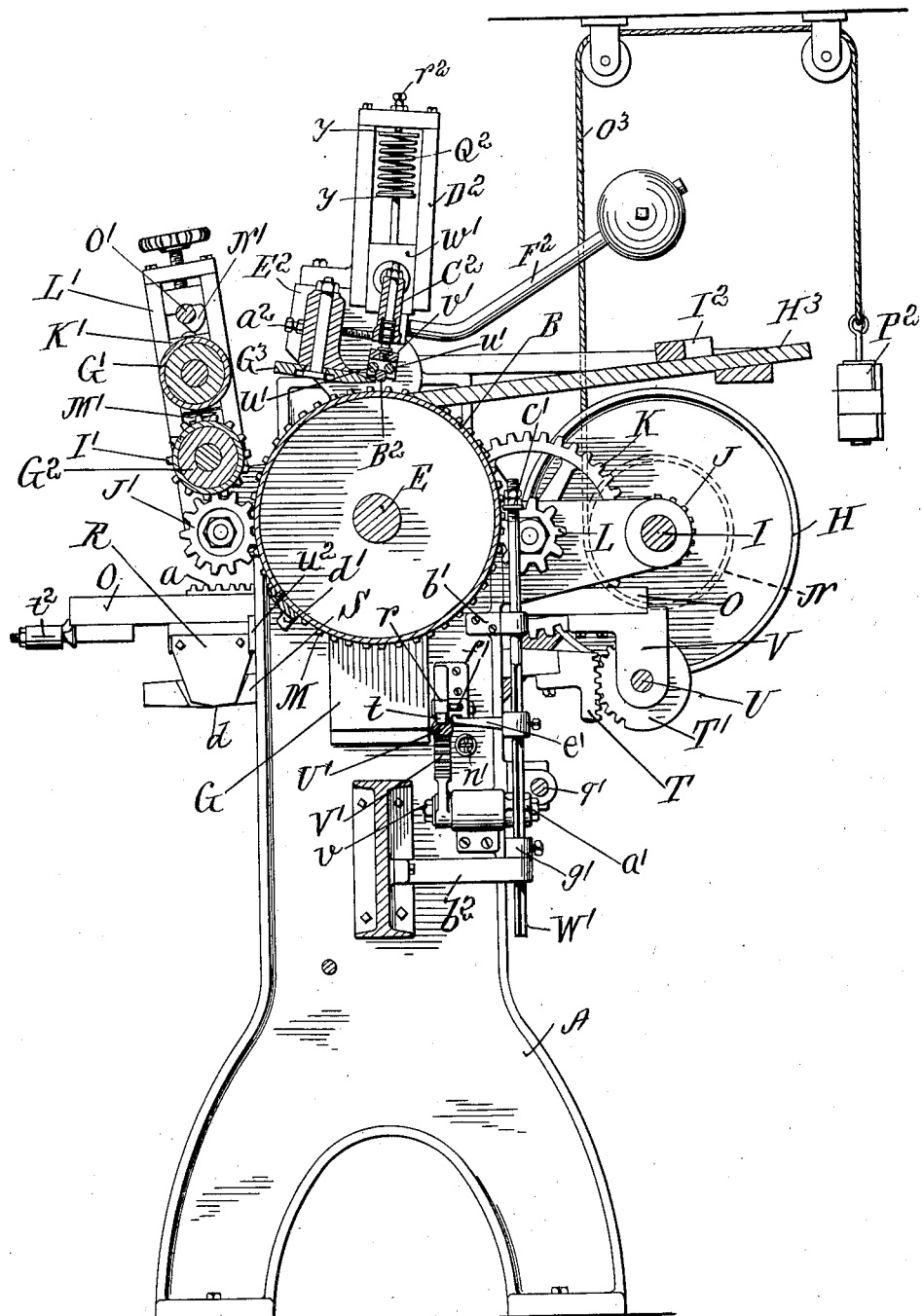
Figure 6:
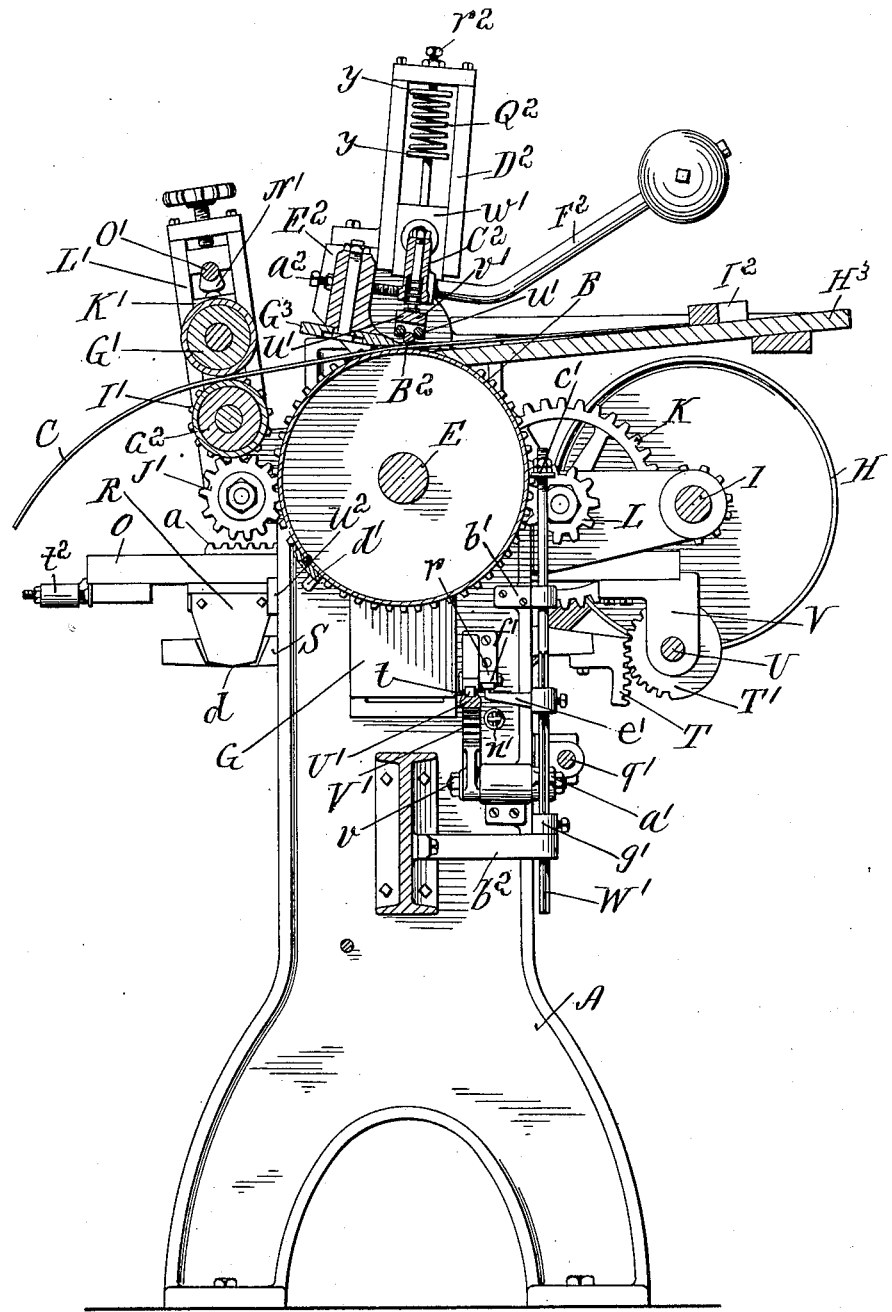
Figure 7:
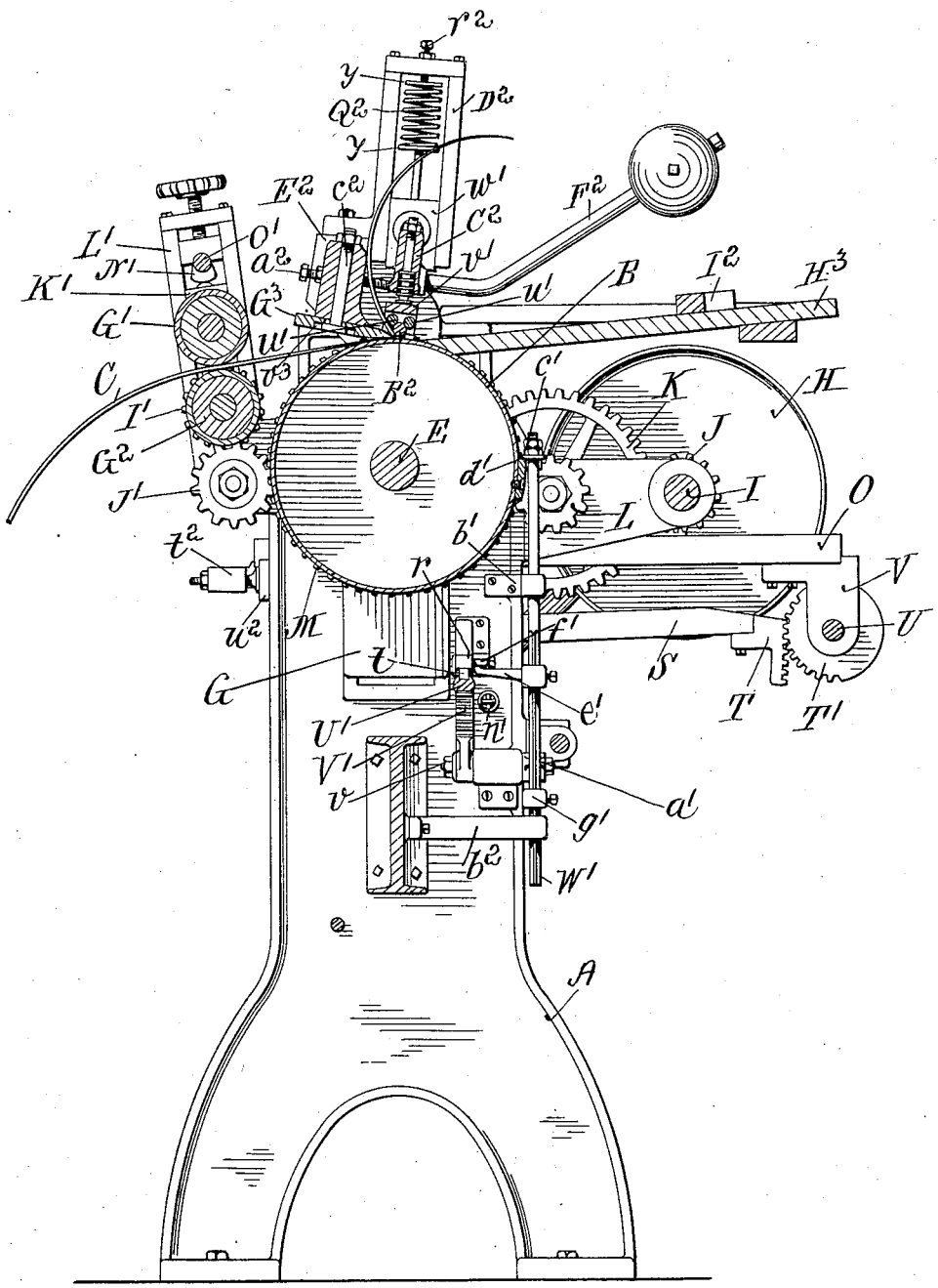
Figure 8:
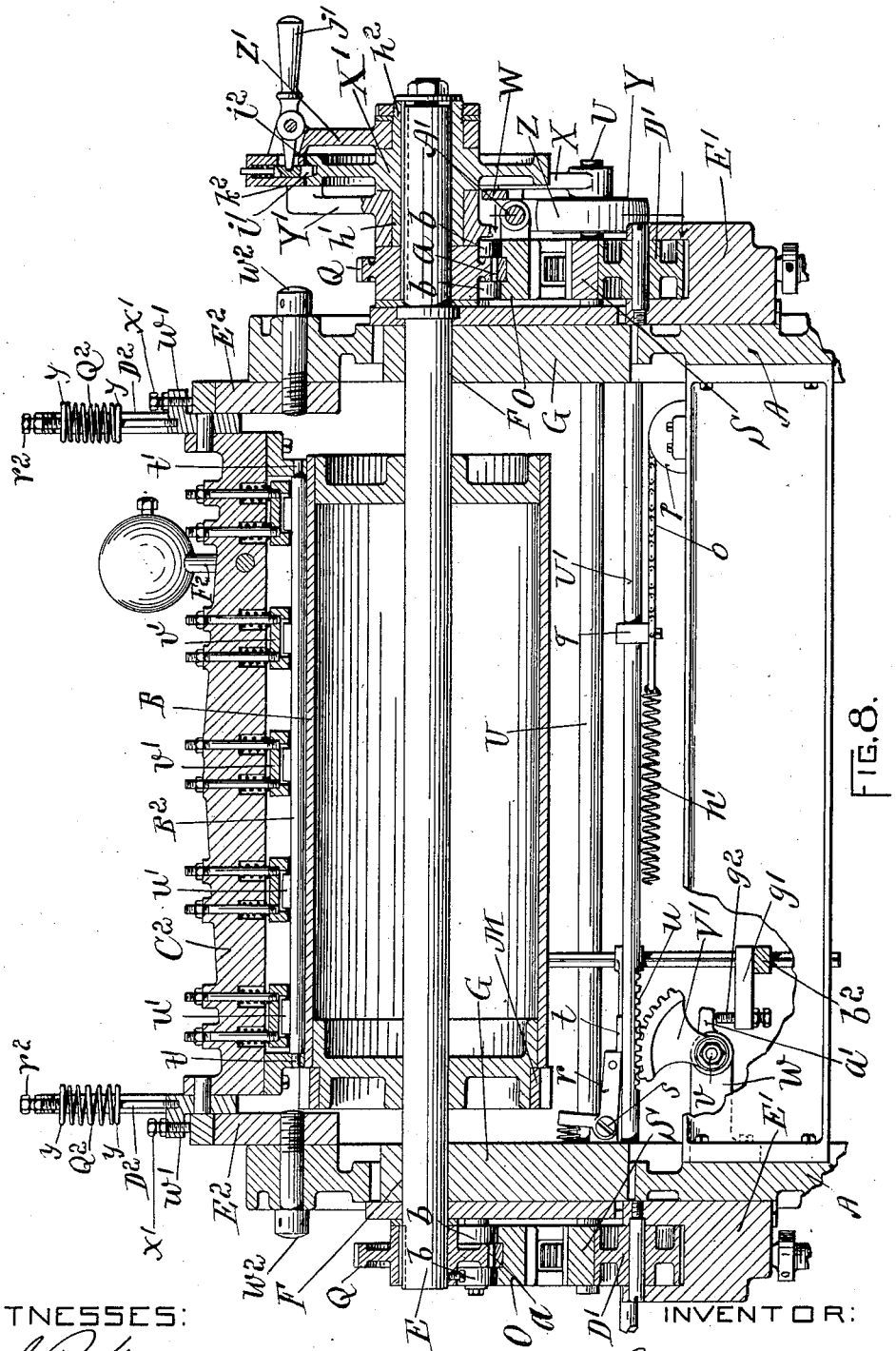

In the accompanying drawings:—Figure 1 represents the front elevation of the machine. Fig. 2 represents the right hand side view when the machine is not in operation. Fig. 3 represents the same side view when the feeding table has been raised toward the knife by the movement of the hand lever, to engage with the leather strip, which is to be operated upon. Fig. 4 represents the same side view when the scarf of the leather strip has been completed. Fig. 5 represents a vertical section taken in the line 5 5, of Fig. 1, when the parts are in the position shown in Fig. 2. Fig. 6 represents a vertical section taken in the line 5 5, of Fig. 1, when the parts are in the position shown in Fig. 3. Fig. 7 represents a section taken in the line 5 5, of Fig. 1, showing the parts of the machine at the end of the belt shaving operation as in Fig. 4. Fig. 8 represents a vertical section taken in the line 8 8, of Fig. 3. Fig. 9 represents a side view and partial section of the index wheel for determining the length of the taper of the belt. Fig. 10 represents a diagrammatic horizontal projection of a portion of the periphery of the index wheel. Fig. 11 represents the transverse section of the friction strap for clamping the inclined planes which serve to raise the feeding bed. Fig. 12 represents a top view of the knife-bar and knife, a portion of the knife-bar being broken away. Fig. 13 represents a transverse section taken in the line 13 13, of Fig. 12. Fig. 14 represents the side view of one of the spring-actuated anti-friction rollers employed to support the presser roller. Fig. 15 represents a top view of the gage table, and the gage bar for gaging the length of the cut to be taken by the knife. Fig. 16 represents a detail side view showing the construction of the joint between the rack-bar and the inclined plane which serves to raise the feeding bed. Fig. 17 represents a section taken in the line 17 17, of Fig. 16. Fig. 18 represents a detail top view, showing the index wheel.

In the drawings, A represents the frame of the machine, B represents an oscillatory feeding bed, by means of which the strip of leather belting C is supported under the knife $G^3$, the said feeding bed being secured to the shaft E, which is held for partial rotation in the bearings F F, formed in the vertically sliding bearing boxes G G. The feeding bed B being driven in the outward direction to withdraw the leather strip, by means of the friction pulley H, from the shaft I of which operative connection is made with the said feeding bed B, by means of the pinion J, upon the shaft I, together with the intermediate gear and pinion K, L, and the gear M, which latter is located at the end of the said feeding bed; and is driven in the forward direction by means of the winding drum N, secured to the shaft I, and the rope $O^3$, one end of which is secured to the periphery of the said winding drum, and the other end to the suspended attached weight $P^2$, the said weight being adapted to cause the unwinding rotary movement of the drum N, upon the release of the friction clutch of the pulley H.

At the opposite sides of the machine are placed the reciprocating rack-bars O O, upon one of which is mounted the hand lever P. The teeth $a$, of the rack-bars O O, engage with the gears Q Q, upon the shaft E of the feeding bed B, said rack-bars being held to move back and forth under the anti-friction rollers $b$ $b$, which revolve upon studs at the outer sides of the bearing boxes G G. To the downwardly extending supports R, secured to the said rack-bars, are pivoted the inclined planes S S, the turning joint $c$ of the said inclined planes being so constructed, as shown in Figs. 16 and 17, that the turning point $d$ will be coincident with the lower surface thereof or nearly so, a semi-circular groove $f$ being made at each side of the said inclined planes, to receive the tightly fitted circular feather $g$, which is loosely held in a semi-circular groove $h$, at the inner side of the side pieces $i$ $i$, of the supports R R. The forward ends of the pivoted inclined planes S S, are provided with the gear segments T T, which engage with the gear pinion segments $T^1$ $T^1$, upon the rock shaft U, which shaft extends from side to side of the machine, and is supported in bearings V, which are connected to the forward ends of the said rack-bars O O. The said gear pinion segments $T^1$ $T^1$ are actuated by means of the hand lever P, operative connection being made from the said hand lever to the rack-shaft U, of the gear pinion segments, by means of the link W, and the crank arm X, which latter is secured to the end of the said rock-shaft.

Upon the grooved periphery of the disk Y, secured to the rock-shaft U, is placed the friction clamping strap Z, one ear $j$ of which is provided with a screw-threaded perforation, which receives the screw-threaded end $k$ of the rod $A^1$, the said rod being held in the bearings $l$ $l$, secured to the side of the rack-bar O, and actuated for turning movement to effect the engagement of the clamping strap Z, with the disk Y, to bind the said rock-shaft U, by means of the torsion spring $B^1$, and the said clamping strap is actuated to release the rock-shaft U, by means of the arm $m$, attached to the end of the rod $A^1$, together with the handle $C^1$ jointed to the hand lever P, and the wire connecting rod $x$; whereby upon pressing the handle $C^1$ toward the hand lever P, the shaft U will be released from the action of the clamping strap Z; and upon releasing the handle $C^1$ from pressure the action of the torsion spring $B^1$ upon the rod $A^1$ will serve to securely bind the said shaft.

Below the surface of the pivoted inclined planes S S, are placed the rollers $D^1$ $D^1$, journaled in the slides $E^1$ $E^1$, which are adjusted vertically by means of the adjusting screws $O^2$ $O^2$, the vertical adjustment of the said rollers $D^1$ $D^1$ serving to control the vertical movement of the feeding bed B.

To the frame A, at opposite sides of the machine, are secured the brackets $F^1$ $F^1$, which serve to support the worm gears $J^2$ $J^2$, keyed to nuts $K^2$, which are held within the said brackets by means of the flange $m^2$, as shown in Fig. 2, the said worm gears and their connected nuts being caused to revolve in unison, by means of the worms $L^2$ $L^2$, which are secured to the ends of the shaft $M^2$, the projecting end of the said shaft being adapted to receive a hand crank by means of which the shaft may be rotated. Within the nut $K^2$ is placed the hollow screw $N^2$, which is prevented from turning by means of the groove $n^2$, in the bracket $F^1$, and the semi-circular spline $o^2$ in the flange of the hollow screw; the said hollow screw also forming a nut for the independent adjusting screw $O^2$, the head of which bears against the under side of the slide $E^1$. The independent screws $O^2$ $O^2$ serve to adjust the height of the feeding bed B, at its ends, and upon the completion of the adjustment of the said feeding bed at its end, it may be adjusted bodily to its proper position relatively to the knife, by means of the connected worm gears $J^2$ $J^2$, and their nuts $K^2$. The feed rolls $G^1$ $G^2$ are connected by means of the gears $H^1$ $H^2$, and are driven from the gear M at the end of the feeding bed B, by means of the gear $I^1$ upon the end of the lower roll, and the intermediate gear $J^1$. The upper feed roll is held in the sliding boxes $K^1$, of the housings $L^1$ $L^1$, the said feed roll and its boxes being held in their upward position by means of expansion springs $M^1$ $M^1$, located under the said boxes. The upper roll $G^1$ is to be closed down upon the leather strip by means of cams $N^1$ $N^1$, secured to the cam shaft $O^1$, to the outer end of which is attached the arm $P^1$, from which connection is made to the lever $T^2$ of the treadle $Q^1$, by means of the link $R^1$, the succeeding upward movement being imparted to the said treadle by means of the spiral spring $n$, in connection with the corresponding action of the spiral spring $n^1$. The downward movement of the treadle $Q^1$ is imparted to the shipper arm $S^1$ of the friction clutch pulley H, by means of the chain $o$, connected to the lever $T^2$ of the treadle, and passing over the grooved pulley $p$, to attachment to the collar $q$, upon the sliding shipper rod $U^1$; the friction clutch of the said pulley H, being held in its disengaged position by the action of the spring $n^1$, which is connected at one end to the frame A, and at the other end to the collar $q$, and the said friction clutch is retained in its engaged position, by means of the spring actuated pawl $r$, which is pivoted to the frame A, at the point $s$, and engages with the lug $t$, upon the shipper rod $U^1$. The shipper rod is provided at its under side with the rack teeth $u$, which engage with the teeth of the segment gear $V^1$, the said segment gear being secured to the inner end of a short shaft $v$, which is held in the bearing bracket $w$, and to the outer end of the said shaft is secured the engaging arm $a^1$ shown in Fig. 8. The brackets $b^1$ $b^2$ serve to support the vertical tripper rod $W^1$, squared at its lower portion to prevent it from turning and provided at its upper end with the transverse engaging piece $c^1$, which is adapted for engagement by the lug or pin $d^1$, which pin projects from the surface of the feeding bed B. Upon the tripper rod $W^1$ between the brackets $b^1$ $b^2$ is secured the engaging arm $e^1$, the outer end of which is adapted for engagement with the pin $f^1$ projecting from the side of the pawl $r$, to cause its disengagement from the lug $t$, of the shipper rod, with the consequent disengagement of the clutch of the pulley H, by the action of the spring $n^1$.

A separate and independent means for disengaging the clutch of the pulley H, is provided by means of the arm $g^1$ secured to the tripper rod $W^1$, and having at its outer end the adjusting screw $g^2$, which screw upon the upward movement of the rod $W^1$ engages with the arm $a^1$ of the shaft $v$, of the segment gear $V^1$, and such engagement will impart a positive movement to the shipper rod $U^1$, in case the said shipper rod has not been previously moved to effect the disengagement of the clutch of the pulley, by the action of the spring $n^1$, the said spring being preferably employed to give a quicker action than could be effected by the segment gear. But in case the spring should fail to act from any cause, the disengagement will be positively effected by the action of the gear, so that damage to the machine will be in all cases surely prevented.

Upon the outer end of the shaft E, of the feeding bed B, is secured the index wheel $X^1$, and upon the inner hub $h^1$ of the said index wheel, is loosely placed the buffer lever $Y^1$, and upon the outer hub $h^2$ of the said index wheel, is loosely placed the index arm $Z^1$, provided with the spring actuated index pin $i^1$, which is adapted for engagement with the holes $i^2$ made in the periphery of the said index wheel $X^1$, as shown in section in Figs. 8 and 9, the said pin $i^1$ being withdrawn from the said perforations, by means of the hand lever $j^1$ pivoted to the arm $Z^1$. The index wheel $X^1$ is also provided with the stops $k^1$ $k^1$, which serve to limit the movement of the index arm $Z^1$. To the lower end of the buffer lever $Y^1$ is jointed the piston rod $l^1$ of the air cushion cylinder $A^2$, the outward movement of the piston $m^1$ within the cylinder $A^2$, through the action of the spring $o^1$, being limited by means of the collar $p^1$, upon the piston rod. The cylinder $A^2$ is secured to the end of the rock shaft $q^1$ journaled to the frame A, in order to compensate for the swinging movement of the buffer lever $Y^1$, the head $r^1$ of the cylinder being provided with a vent orifice $s^1$, and with the leather buffer $s^2$ for receiving the impact of the piston $m^1$ at the forward end of its stroke.

The leather strip C, is held in contact with the surface of the feeding bed B, at the edge of the knife $G^3$, by means of the presser roll $B^2$, as shown in Figs. 7 and 8, the said roll being journaled at its ends $t^1$ $t^1$, and guided at its intermediate portions by the duplicate anti-friction guide rollers $u^1$ $u^1$, shown in Figs. 7 and 8, the said guide rollers being arranged to turn loosely upon the pivot screws $y^1$, as shown in the section, Fig. 14, which are held in the spring actuated heads $v^1$ of the presser bar $C^2$, whereby the presser roll $B^2$ is allowed to yield to the varying thicknesses of the leather in its transverse section, by the flexure of the said roll. The presser bar $C^2$ is loosely pivoted to the spring actuated pivot blocks $w^1$ $w^1$ held in the housings $D^2$ $D^2$, bolted to the knife bar $E^2$, the said knife bar being pivoted to the frame A for adjusting movement, by means of the tightening pivot bolts $w^2$ $w^2$, the axes of which are in line with the cutting edge of the knife $G^3$, whereby upon the turning of the knife bar upon the said pivot bolts $w^2$ $w^2$, the edge of the knife will be maintained in its set position relatively to the surface of the feeding bed B, the said pivot blocks $w^1$ $w^1$ being adjusted vertically within the housings $D^2$, by means of the adjusting screws $x^1$ $x^1$, and by this means the height of the presser bar $C^2$ may be regulated as required. The pressure springs $Q^2$ $Q^2$, which operate upon the said pivot blocks, are held between the heads $y$ $y$, and are, as shown in Figs. 1 and 2, preferably compressed by means of cams $R^2$ $R^2$, located at the ends of the shaft $S^2$, the said shaft being operated by means of the hand crank $U^2$.

The cams $R^2$ $R^2$ are provided with the three curved surfaces $z$, $z^1$, $z^2$, located at different distances from the center of the cam, so that upon turning the shaft $S^2$ by means of the hand crank $U^2$, the springs $Q^2$ $Q^2$, at the opposite ends of the presser bar will be equally compressed, whereby suitable provision can be quickly made for the attainment of either greater or less pressure upon the leather strip C, as may be required in order to compensate for variation in the width of the leather strip to be operated upon, the said cams being caused to act upon the sliding pins $z^3$, which extend upward from the upper heads $y$, of the said springs. In other figures of the drawings, however, the springs $Q^2$ $Q^2$ are shown as made independently adjustable by means of the adjusting screws $r^2$.

The presser bar $C^2$ is also provided with the weighted arm $F^2$, by means of which the presser bar is held to its working position which is determined by means of the stop screw $a^2$, which passes through the knife bar $E^2$. The knife $G^3$ is provided with the adjusting slots $v^2$, and secured to the knife bar $E^2$, by means of the bolts $c^2$, and near each end of the knife bar is placed a permanent gage $d^2$, as shown in Figs. 12 and 13, for setting the edge of the knife in line with the turning axis of the knife bar $E^2$, whereby, upon turning the knife bar upon its pivots to vary the inclination of the knife, the position of the cutting edge of the knife relatively to the feeding-bed will not be changed.

At the rear of the machine is placed the gage table $H^3$, preferably perforated with parallel rows of holes $e^2$, which are represented as being one inch apart, into two of which the pins $f^2$ $f^2$ of the movable gage bar $I^2$ are placed, to locate the said gage bar at any desired number of inches from the edge of the knife. As shown in the drawing, the gage table $H^3$ is numbered to represent inches from 4 to 16, which in this case constitutes the limit of the cutting action of the machine. The corresponding holes $i^2$ made in the periphery of the index wheel $X^1$, are also numbered from 4 to 16, as shown in the horizontally developed diagram of the peripheral surface of the index wheel, in Fig. 10. The head $j^2$ of the index arm $Z^1$, is adapted for engagement with the outwardly extending lug $k^2$ at the upper end of the buffer lever $Y^1$, as shown in Fig. 18. The rod $A^1$ which serves to clamp the rock-shaft U, is provided with a collar $l^2$, which is grooved to receive a series of anti-friction balls $q^2$, as shown in Fig. 11, whereby the power required for unclamping the rock-shaft U by means of the handle $C^1$, will be greatly lessened. The forward movement of the rack-bar O is limited by the inwardly extending arm $t^2$, which is secured to the said bar and engages with the buffer $u^2$, upon the frame of the machine.

The starting point for the operation of the machine is shown in Fig. 2, the index pin $i^1$ having been set in the hole 12, in the index wheel $X^1$, to correspond with the position of the gage bar $I^2$ upon the table $H^3$ at 12 inches from the edge of the knife $G^3$, as illustrated in Fig. 15, the feeding bed B being turned backward by means of the weight $P^2$, until the head $j^2$ of the index arm $Z^1$ has been brought to engagement with the lug $k^2$ of the buffer lever $Y^1$, and the pivoted inclined plane S carried back so that the turning point $d$ of the said inclined plane will be located at the distance of 12 inches from the vertical plane of the axis of the supporting roller $D^1$. Now upon inserting the strip of leather C between the feed rolls $G^1$ $G^2$, and between the knife $G^3$ and the surface of the feeding bed B, and pushing it forward until the squared end of the said leather strip reaches the gage bar $I^2$ upon the table $H^3$, thus locating the end of the leather strip $C^2$ at the required distance of 12 inches from the edge of the knife $G^3$—the said gage bar $I^2$ also serving to bring the axis of the strip to the true line—and then upon pulling backward upon the hand lever P, the gear segments $T^1$ $T^1$ and T T, will be actuated to cause the downward movement of the outer end of the pivoted inclined planes S S, at the opposite sides of the machine thus serving to cause the elevation of the feeding bed B, until the leather strip $C^2$ is firmly engaged between the said feeding bed, and the edge of the knife $G^3$, the grip of the hand of the operator upon the handle $C^1$, which is jointed to the hand lever P, operating upon the rod $A^1$, through the arm $m$ and connecting rod $x$, to cause the release of the clamping strap Z, from the action of the torsion spring $B^1$, and thus releasing the shaft U, for effecting the desired rotary movement of the same, and upon releasing the handle $C^1$ from pressure, the action of the torsion spring $B^1$ upon the rod $x$, will serve to bind the shaft U in its set position, the inclined plane S being now set at the required angle for causing the gradual elevation of the feeding bed to produce the required scarf upon the end of the leather strip $C^2$. Now by pressing down upon the treadle $Q^1$, the clutch of the friction pulley H will be carried into engagement to start the machine; and as the leather strip $C^2$ is being drawn back by means of the action of the feeding rolls $G^1$ $G^2$ thereon, the surface of the feeding bed B will be gradually raised toward the knife until the turning point $d$ of the inclined plane S has been carried forward over the axis of the supporting roller $D^1$, as shown in Fig. 4, the said turning point $d$ being then located in a plane which extends at right angles to the bearing surface of the rack-bar O, and passes through the axis of the supporting roller at which position the cutting of the scarf will be completed. The outer end of the pivoted inclined plane S is inclined slightly upward from the turning point $d$, in order that there will be no danger of the surface of the feeding bed B coming in contact with the knife, owing to the occurring variations in the inclination of the inclined planes S S, in providing for laps of various lengths, and for differences in the thickness of the leather, thus being able to allow the feeding bed to continue its movement after the cutting of the leather has been completed, thereby obtaining a desirable allowance for the stretching of the strip. And when the feeding bed B has been carried back to near the extreme of its backward movement, the lug $d^1$ which projects from the surface of the said feeding bed engages with the engaging piece $c^1$ upon the tripper rod $W^1$, to cause the disengagement of the clutch of the pulley H, either by the action of the spring $n^1$, or otherwise by the action of the segment gear $V^1$ upon the rack teeth $u$ of the shipper rod, as hereinbefore described. And upon the disengagement of the clutch of the pulley H, the action of the weight $P^2$, will serve to carry the machine back to the position shown in Fig. 3, in which the feeding bed B will be lowered away from the knife for the insertion of another leather strip, to be acted upon as before described.

I claim as my invention:—

1. In a machine of the character described, the combination of a knife for scarfing the strip of belting, a bed for supporting the belting under the action of the knife, the reciprocating rack-bar geared with the belt scarfing mechanism, the inclined plane pivotally connected with the rack-bar and having its pivotal turning point in or near the plane of its bearing surface, means for varying the inclination of the inclined plane relatively to the rack-bar, the roller for supporting the inclined plane and rack-bar, and means for carrying the pivotal turning point of the inclined plane forward to a plane which extends at right angles to the plane of the bearing surface of the rack-bar and passes through the axis of the supporting roller.

2. In a machine of the character described, the combination of a knife for scarfing the strip of belting, a bed for supporting the belting under the action of the knife, the reciprocating rack-bar geared with the belt-scarfing mechanism, the inclined plane pivotally connected with the rack-bar and having its pivotal turning point in or near the plane of its bearing surface, the bearing surface of the said inclined plane beyond the turning point being backwardly inclined, means for varying the inclination of the inclined plane relatively to the rack-bar, the roller for supporting the inclined plane and rack-bar, and means for carrying the pivotal turning point of the inclined plane forward to a point beyond the plane which extends at right angles to the plane of the bearing surface of the rack-bar and passes through the axis of the supporting roller.

3. In a machine of the character described, a knife for scarfing the strips of belting, a movable bed for supporting the belting under the action of the knife, the shaft, the loose clutch-pulley on said shaft, connection between said shaft and said movable bed, a drum on said shaft, a cord and weight on said drum, the index wheel connected with the movable bed and serving to gage the limit of the cutting action, the index arm at the side of the index wheel, the index pin carried by said arm, the buffer lever located at the side of the index wheel and adapted for engagement by the index arm, and the air cushion connected with the buffer lever, whereby upon the falling of the weight at the disengagement of the clutch, the backward momentum of the cutting mechanism will be suitably checked.

4. In a machine of the character described, the knife for scarfing the belting strip, a bed for supporting the belting strip under the action of the knife, a pivotally held knife bar, a pivotally held spring-actuated presser bar supported by the knife bar, the presser-roll, and the spring-actuated anti-friction rollers bearing upon the presser-roll to hold the same against the leather strip at the edge of the knife.

5. In a machine of the character described, the bed for supporting the belting strip to be operated upon, the pivotally held knife bar and the knife secured to the knife bar with its cutting edge in line with the pivot axis of the said knife bar, whereby the knife bar may be turned upon its pivot axis, without disturbing the adjustment of the edge of the knife relatively to the supporting bed.

EDWARD H. HATHAWAY.

Witnesses:
SOCRATES SCHOLFIELD,
J. ROLLO MIDDLEMISS.